United States Patent
Wang et al.

(10) Patent No.: US 9,885,923 B2
(45) Date of Patent: Feb. 6, 2018

(54) LIQUID CRYSTAL PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Hui Wang, Beijing (CN); Yuanhui Guo, Beijing (CN); Chun Wang, Beijing (CN); Junsheng Chen, Beijing (CN); Xiaohe Li, Beijing (CN); Chuncheng Che, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 52 days.

(21) Appl. No.: 14/915,623

(22) PCT Filed: Aug. 26, 2015

(86) PCT No.: PCT/CN2015/088144
§ 371 (c)(1),
(2) Date: Feb. 29, 2016

(87) PCT Pub. No.: WO2016/138748
PCT Pub. Date: Sep. 9, 2016

(65) Prior Publication Data
US 2017/0003538 A1 Jan. 5, 2017

(30) Foreign Application Priority Data

Mar. 3, 2015 (CN) .......................... 2015 1 0095211

(51) Int. Cl.
*G02F 1/1339* (2006.01)

(52) U.S. Cl.
CPC ........ *G02F 1/13394* (2013.01); *G02F 1/1339* (2013.01); *G02F 2001/13396* (2013.01); *G02F 2001/13398* (2013.01)

(58) Field of Classification Search
CPC ....... G02F 1/13394; G02F 2001/13396; G02F 2001/13398; G02F 1/13392; G02F 2001/133388; G02F 1/1339
(Continued)

(56) References Cited

U.S. PATENT DOCUMENTS 9,488,884 B2 * 11/2016 Hiratsuka ........... G02F 1/13439
2007/0103636 A1 5/2007 Hsiao
(Continued)

FOREIGN PATENT DOCUMENTS

| CN | 101364013 A | 2/2009 |
| CN | 101762916 A | 6/2010 |

(Continued)

OTHER PUBLICATIONS

First Office Action for Chinese Application No. 201510095211.2, dated Feb. 28, 2017, 7 Pages.
(Continued)

*Primary Examiner* — Hoan C Nguyen
(74) *Attorney, Agent, or Firm* — Brooks Kushman P.C.

(57) ABSTRACT

The present disclosure relates to the technical field of liquid crystal display. A liquid crystal panel and a display panel are provided. A main post spacer of the liquid crystal panel is arranged on a first substrate. A stopping structure used to stop the main post spacer from moving in a direction away from a second substrate is arranged on the second substrate. Hence, even if lots of liquid crystals are filled, the main post spacer and the second substrate may be kept in a seamless state due to the stopping structure.

20 Claims, 3 Drawing Sheets

(58) Field of Classification Search
USPC .......................................................... 349/155
See application file for complete search history.

(56) References Cited

U.S. PATENT DOCUMENTS

| | | | | |
|---|---|---|---|---|
| 2013/0155367 A1* | 6/2013 | Tomioka | ............... | G02F 1/1339 349/155 |
| 2013/0308084 A1* | 11/2013 | Niwano | ................ | G02F 1/1339 349/155 |
| 2015/0362782 A1* | 12/2015 | Miao | ................... | G02F 1/13394 349/156 |
| 2016/0154265 A1 | 6/2016 | Cai et al. | | |
| 2016/0370628 A1* | 12/2016 | Zhe | ..................... | G02F 1/13394 |
| 2017/0003538 A1 | 1/2017 | Wang et al. | | |

FOREIGN PATENT DOCUMENTS

| | | | |
|---|---|---|---|
| CN | 203084383 | U | 7/2013 |
| CN | 103439836 | A | 12/2013 |
| CN | 203433239 | U | 2/2014 |
| CN | 103676335 | A | 3/2014 |
| CN | 104330925 | A | 2/2015 |
| CN | 104635384 | A | 5/2015 |
| KR | 20080021965 | A | 3/2008 |

OTHER PUBLICATIONS

International Search Report and Written Opinion for Application No. PCT/CN2015/088144, dated Nov. 20, 2015, 13 Pages.
1$^{st}$ Chinese Office Action, English Translation.
International Search Report and Written Opinion, English Translation.
CN101364013A, English Abstract and Translation.
CN101762916A, English Abstract and Translation.
CN103439836A, English Abstract and Translation.
CN103676335A, English Abstract and Translation.
CN104330925A, English Abstract and U.S. Equivalent U.S. Pub. No. 2016/154265.
CN104635384A, English Abstract and U.S. Equivalent U.S. Pub. No. 2017/003538.
CN203084383U, English Abstract and Translation.
CN203433239U, English Abstract and Translation.
KR20080021965A, English Abstract and Translation.
Second Office Action for Chinese Application No. 201510095211.2, dated Aug. 31, 2017, 6 Pages.

* cited by examiner

LIQUID CRYSTAL PANEL AND DISPLAY DEVICE

CROSS-REFERENCE TO RELATED APPLICATION

The present application is the U.S. national phase of PCT Application No. PCT/CN2015/088144 filed on Aug. 26, 2015, which claims a priority to Chinese Patent Application No. 201510095211.2 filed on Mar. 3, 2015, the disclosure of which is incorporated herein by reference in its entirety.

TECHNICAL FIELD

The present disclosure relates to the technical field of liquid crystal display, in particular, to a liquid crystal panel and a display device.

BACKGROUND

Thin film transistor-liquid crystal display (abbreviated as TFT-LCD) which has advantages such as small size, low power consumption and free of radiation, develops rapidly in recent years and takes a dominant role in the current panel display market. The main component of a liquid crystal panel is a liquid crystal panel. In manufacturing process of the liquid crystal panel, the design for cell gap and compression resistivity is a key technology of the liquid crystal display and directly affects the quality of the liquid crystal display.

As shown in FIG. 1, a liquid crystal panel includes an array substrate 20' and a color filter substrate 10' which are oppositely arranged to form a cell, and a liquid crystal layer between the array substrate 20' and the color filter substrate 10'. The array substrate 20' and the color filter substrate 10' are sealed by a sealant 3. A thickness of the liquid crystal layer (i.e., a cell gap) is mainly controlled by a post spacer (PS) located between the array substrate 20' and the color filter substrate 10'. According to functions, PSs include a main PS 1' and an auxiliary PS 2'. The main PS 1' has a length larger than that of the auxiliary PS 2', and the main PS 1' and the auxiliary PS 2' need to be formed through different processes. A number of the auxiliary PS 2' is larger than that of the main PS 1'. After the liquid crystal panel is made into a cell, the main PS 1' may have a certain amount of compression to maintain the cell gap, while the auxiliary PS 2' has no amount of compression. In a case that the liquid crystal panel is subjected to a relatively large external force, the auxiliary PS 2' is compressed and functions as a main supporting member.

In practical production, the fluctuation of amounts of liquid crystals filled in respective liquid crystal panels should be considered to ensure the stability of mass production on the production line. For example, a theoretical mass of liquid crystals necessary for each liquid crystal panel is 100 mg. Considering the accuracy of a device for dripping liquid crystals in the production line, a mass of liquid crystals finally inside a liquid crystal panel may range from 93 mg to 107 mg, this fluctuation range of the mass of liquid crystals is called as a liquid crystal margin (LC margin). A main parameter determining a size of the LC margin is a height of the PS. In a case of disregarding other factors, the LC margin should be maximized to ensure the stability of mass production of the production line. An amount of compression of the main PS 1' determines an upper limit of the LC margin; the larger the amount of compression is, the larger the upper limit of the LC margin is. A height difference between the main PS 1' and the auxiliary PS 2' determines a lower limit of the LC margin; the larger the height difference is, the smaller the lower limit is.

If the height difference between the main PS 1' and the auxiliary PS 2' is small, the compression resistivity of the panel is strong, but the lower limit of the LC margin increases; the compression resistivity and the lower limit of the LC margin conflict. When developing the products practically, the compression resistivity is ensured at the sacrifice of the lower limit of the LC margin; hence, the process fluctuation in mass production of the products is restricted and the productivity of the production line is greatly affected.

SUMMARY

A liquid crystal panel is provided in the present disclosure, to increase an upper limit of liquid crystal filling.

A display device is further provided in the present disclosure, which includes the above described liquid crystal panel and may ensure both compression resistivity of a product and productivity of a production line.

To solve the above technical problem, a liquid crystal panel is provided according to an embodiment of the present disclosure, including:

a first substrate and a second substrate which are arranged oppositely to form a cell;

a liquid crystal layer filled between the first substrate and the second substrate; and a main post spacer arranged on the first substrate, where the main post spacer is made of an elastic material and is elastically compressed between the first substrate and the second substrate;

where the liquid crystal panel further includes: a stopping structure arranged on the second substrate and used to stop the main post spacer from moving in a direction away from the second substrate and make the main post spacer contact the second substrate in a seamless state.

In the above described liquid crystal panel, optionally, the stopping structure is used to stop the main post spacer from continuing moving after the main post spacer moves a preset distance in the direction away from the second substrate.

In the above described liquid crystal panel, optionally, the stopping structure has a stopping face, and the stopping face is not perpendicular to the second substrate; and the main post spacer has a bearing face which is fitting with the stopping face and is arranged opposite to the stopping face, the stopping face is arranged at a side of the bearing face close to the first substrate.

In the above described liquid crystal panel, optionally, the stopping face is set a certain distance away from the bearing face.

In the above described liquid crystal panel, optionally, the main post spacer and the stopping structure are staggered in a direction parallel to the second substrate;

the main post spacer has a first top face, the first top face is against the second substrate and seamlessly fits with a surface of the second substrate.

In the above described liquid crystal panel, optionally, a first groove is arranged at a surface of the stopping structure opposite to the main post spacer; the main post spacer is provided with a first bulge structure at a position corresponding to the first groove; and the first bulge structure extends into the first groove.

In the above described liquid crystal panel, optionally, the stopping structure is made of an elastic material.

In the above described liquid crystal panel, optionally, the stopping structure has a length not larger than that of the main post spacer.

In the above described liquid crystal panel, optionally, a position of the main post spacer corresponds to a position of the stopping structure; the main post spacer has a first top face and the stopping structure has a second top face; the first top face is against the second top face and the first top face seamlessly fits with the second top face.

In the above described liquid crystal panel, optionally, the first top face of the main post spacer is a flat surface, an inclined surface or a curved surface.

In the above described liquid crystal panel, optionally, a second groove is arranged at a surface of the stopping structure close to the first substrate; a top portion of the main post spacer extends into the second groove; a longitudinal section of the second groove, which is perpendicular to a groove bottom of the second groove, includes a portion having a shape which turns larger downwardly; and the top portion of the main post spacer has a shape which turns smaller downwardly to fit with the longitudinal section of the second groove.

In the above described liquid crystal panel, optionally, the groove bottom of the second groove is the second top face, and a groove wall of the portion having the shape which turns larger downwardly of the longitudinal section of the second groove serves as the stopping face of the stopping structure.

In the above described liquid crystal panel, optionally, a stopping pillar is arranged on the second top face of the stopping structure; a third groove is arranged at a surface of the stopping pillar close to and opposite to the main post spacer; the main post spacer is provided with a second bulge structure at a position corresponding to the third groove; and the second bulge structure extends into the third groove.

In the above described liquid crystal panel, optionally, the stopping structure is made of an elastic material or an inelastic material.

In the above described liquid crystal panel, optionally, the groove is arranged at the main post spacer and the bulge is arranged at the stopping structure.

Optionally, the above described liquid crystal panel further includes an auxiliary post spacer arranged between the first substrate and the second substrate, where the auxiliary post spacer and the main post spacer has a set height difference.

A display device is further provided according to an embodiment of the present disclosure, including the above described liquid crystal panel.

The technical solutions of the present disclosure have the following beneficial effects.

In the technical solutions, the main post spacer of the liquid crystal panel is arranged on the first substrate, the stopping structure used to stop the main post spacer from moving in the direction away from the second substrate is arranged on the second substrate. Hence, even if lots of liquid crystals are filled, the main post spacer and the second substrate may be kept in a seamless state due to the stopping structure. The problem of gravity mura caused by the amount of compression of the main post spacer being zero and a seam existing between the main post spacer and the second substrate when lots of liquid crystals are filled is solved, thereby increasing the upper limit of liquid crystal filling and improving the productivity of the production line. In addition, the height difference between the main post spacer and the auxiliary post spacer can be designed based on compression resistance requirements for the liquid crystal panel, to ensure qualities of products.

BRIEF DESCRIPTION OF THE DRAWINGS

To clarify technical solutions according to embodiments of the present disclosure or conventional technologies, drawings to be used in descriptions for the embodiments or for the conventional technologies are briefly introduced hereinafter. Apparently, the following described drawings are merely for a part of the embodiments of the present disclosure; other drawings can be obtained by the ordinary skilled in the art based on the described drawings without paying inventive efforts.

DETAILED DESCRIPTION OF THE EMBODIMENTS

Figure 1:
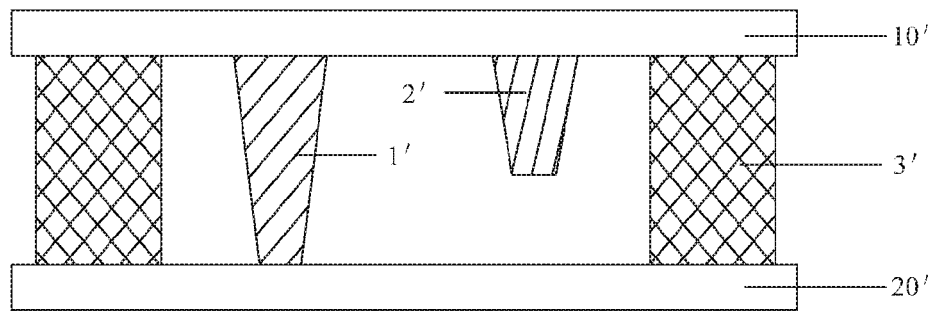
FIG. 1 is a schematic structural diagram of a conventional liquid crystal panel.

Unless other definitions are given, technical terms or scientific terms used herein refer to normal meanings which can be understood by the ordinary skilled in the field to which the present disclosure relates. Terms such as "first" and "second" used in the specification and the list of claims of the present disclosure do not indicate any order, numbers or importance, and are merely used to distinguish different components. Similarly, terms such as "a" or "an" represent there exist at least one, rather than to limit the number. Terms such as "connected with" or "connected to" do not limit to physical or mechanical connections, and can include electrical connections which are either direct or indirect. Terms such as "on/above", "under/below", "left" and "right" are merely used to describe a relative position relationship; if the absolute position of one described object alters, the relative position relationship with respect to the described object alters correspondingly.

On a production line of liquid crystal panels, the larger the liquid crystal margin is, the larger the process fluctuation in mass production is and the higher the productivity of the production line is. The liquid crystal margin is a difference between an upper limit of liquid crystal filling and a lower limit of liquid crystal filling. The larger a height difference between a main post spacer and an auxiliary post spacer of a liquid crystal panel is, the smaller the lower limit of liquid crystal filling is and the larger the liquid crystal margin is. However, the larger the height difference between the main post spacer and the auxiliary post spacer is, the poorer a compression resistivity of the liquid crystal panel is. In practical production, the compression resistivity is ensured at the sacrifice of the lower limit of the liquid crystal margin, thereby greatly affecting the productivity of the production line.

A liquid crystal panel is provided in the present disclosure. The above described conflict between compression resistivity of the liquid crystal panel and productivity of the production line can be solved by increasing the upper limit of liquid crystal filling.

The liquid crystal panel includes a first substrate and a second substrate which are arranged oppositely to form a cell, and a liquid crystal layer between the first substrate and the second substrate. A main post spacer is arranged on the first substrate. A stopping structure is arranged on the second substrate. The main post spacer is in an elastic compressed state. The stopping structure is used to stop the main post spacer from moving in a direction away from the second substrate. Hence, even if lots of liquid crystals are filled, the main post spacer and the second substrate may be kept in a seamless state due to the stopping structure. The problem of gravity mura caused by the amount of compression of the main post spacer being zero and a seam existing between the main post spacer and the second substrate when lots of liquid crystals are filled is solved, thereby increasing the upper limit of liquid crystal filling, increasing the process fluctuation of mass production and improving the productivity of the production line. In addition, the height difference between the main post spacer and the auxiliary post spacer can be designed based on compression resistance requirements for the liquid crystal panel, to ensure qualities of products.

The first substrate may be one of an array substrate and a color filter substrate of the liquid crystal panel, and the second substrate is the other.

It should be noted that in the present disclosure, a seamless state or a seamless fitting between two structures means that there is no seam at a contact position of the two structures and the two structures closely fit at the contact position.

Specific implementations of the present disclosure are further detailed hereinafter in conjunction with drawings and embodiments. The following embodiments are used to explain the present disclosure, rather than to limit the scope of the present disclosure.

As shown in FIG. 2-FIG. 7, a liquid crystal panel is provided according to an embodiment of the present disclosure, including a first substrate 10 and a second substrate 20 which are arranged oppositely to form a cell. A space between the first substrate 10 and the second substrate 20 is sealed by a sealant 3 to form a sealed space. A liquid crystal layer (not shown in the drawings) is filled in the sealed space. A main post spacer 1 and an auxiliary post spacer 2 are arranged on the first substrate 10. The main post spacer 1 is an elastic material and the main post spacer 1 and the auxiliary post spacer 2 have a certain height difference. After the liquid crystal panel is to form a cell, the main post spacer 1 is elastically compressed between the first substrate 10 and the second substrate 20 to maintain a cell gap of the liquid crystal panel; while the auxiliary post spacer 2 has no amount of compression. The auxiliary post spacer 2 is only compressed when the liquid crystal panel is subjected to an external pressure, functioning as a main supporter to enhance the compression resistivity of the liquid crystal panel.

A stopping structure 4 is arranged on the second substrate 20 and is used to stop the main post spacer 1 from moving in a direction away from the second substrate 20. In practical manufacturing process, in a case that lots of liquid crystals are filled, the main post spacer 1 and the second substrate 20 are kept in a seamless state because of the stopping structure 4, thereby increasing an upper limit of liquid crystal filling.

With technical solutions of the present disclosure, a liquid crystal margin in mass production process is enlarged by increasing the upper limit of liquid crystal filling, thereby improving the productivity of the production line. In addition, the height difference between the main post spacer and the auxiliary post spacer can be designed based on compression resistance requirements for the liquid crystal panel, to ensure qualities of products.

The reason why the main post spacer 1 moves in the direction away from the second substrate 20 is described as follows. In the case that lots of liquid crystals are filled between the first substrate 10 and the second substrate 20, outward forces may be generated on the first substrate 10 and the second substrate 20, and accordingly, the main post spacer 1 on the first substrate 10 is caused to move in the direction away from the second substrate 20.

The definition of the upper limit for liquid crystal filling is given as follows. After the main post spacer 1 moves a relatively large distance in the direction away from the second substrate 20, an amount of elastic compression of the main post spacer 1 may be 0 and a gap is generated between the main post spacer 1 and the second substrate 20, resulting in a gravity mura phenomenon. A maximum liquid crystal filling amount which ensures a seamless state between the main post spacer 1 and the second substrate 20 is regarded as the upper limit of liquid crystal filling.

Figure 2:
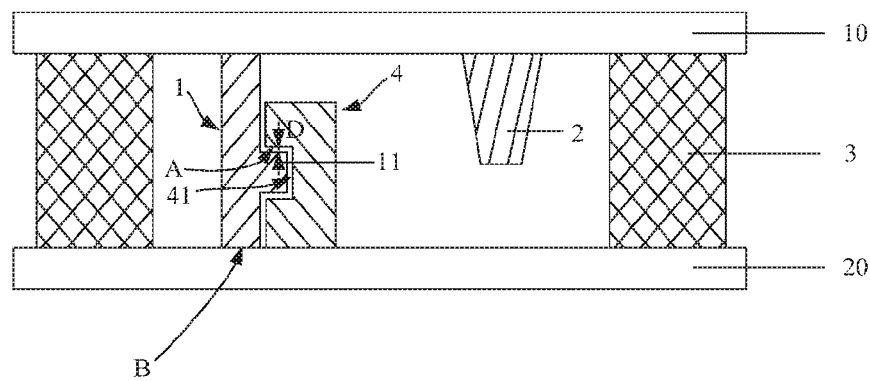
FIG. 2 is a first schematic structural diagram of a liquid crystal panel according to an embodiment of the present disclosure.
Figure 3:
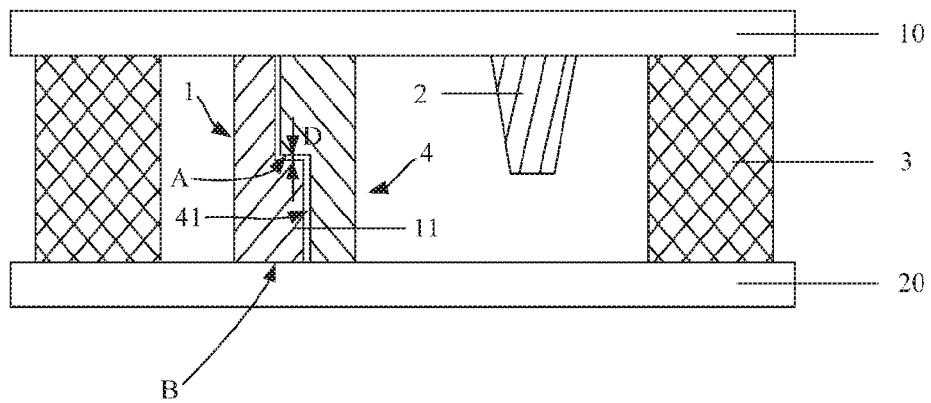
FIG. 3 is a second schematic structural diagram of a liquid crystal panel according to an embodiment of the present disclosure.
Figure 7:
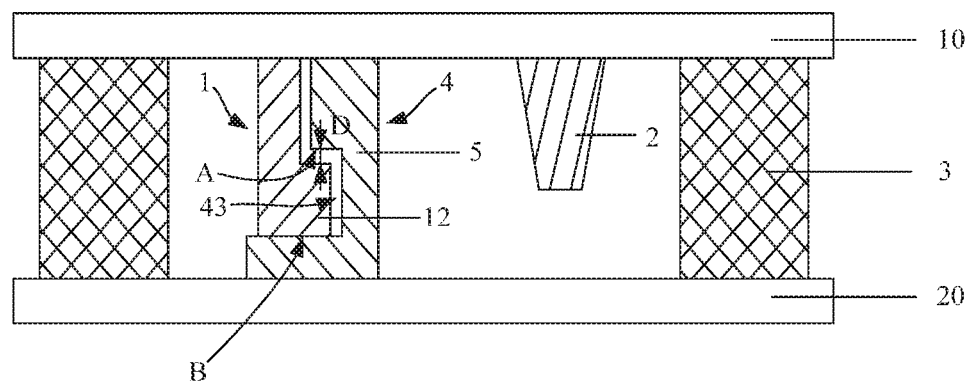
FIG. 7 is a sixth schematic structural diagram of a liquid crystal panel according to an embodiment of the present disclosure.

Furthermore, it is set that, after the main post spacer 1 moves a preset distance (as shown in FIG. 2, FIG. 3 and FIG. 7, the preset distance is D) in the direction away from the second substrate 20, the stopping structure 4 stops the main post spacer 1 from continuing moving and keeps a seamless state between the main post spacer 1 and the second substrate 20, thereby further increasing filling amount of liquid crystals, increasing the upper limit of liquid crystal filling and improving the productivity of the production line.

The stopping structure 4 may be made of an elastic material or may be made of an inelastic material. The stopping structure 4 has a length not larger than that of the main post spacer 1 (a length of the main post spacer 1 is for maintaining the cell gap of the liquid crystal panel).

Optionally, the stopping structure 4 is made of an elastic material and has a length approximately similar to that of the main post spacer 1. As shown in FIG. 3, the stopping structure 4 is elastically compressed between the first substrate 10 and the second substrate 20 and cooperates with the main post spacer 1 to maintain the cell gap of the liquid crystal panel and improve stability of the cell gap of the liquid crystal panel.

Figure 4:
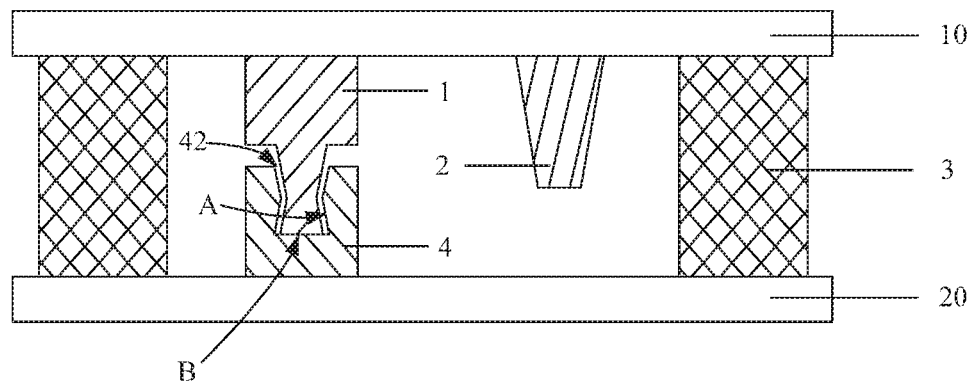
FIG. 4 is a third schematic structural diagram of a liquid crystal panel according to an embodiment of the present disclosure.
Figure 5:
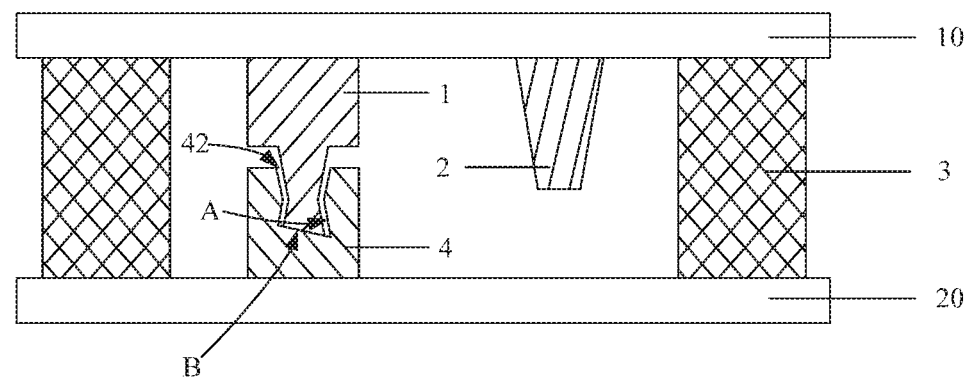
FIG. 5 is a fourth schematic structural diagram of a liquid crystal panel according to an embodiment of the present disclosure.
Figure 6:
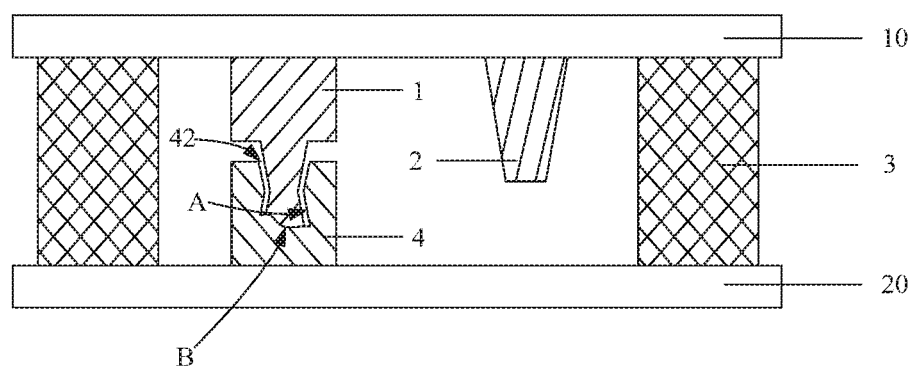
FIG. 6 is a fifth schematic structural diagram of a liquid crystal panel according to an embodiment of the present disclosure.

In a specific implementation, the stopping structure 4 according to the embodiment of the present disclosure has a stopping face A. The stopping face A is not perpendicular to the second substrate 20. (The stopping face A may be parallel to the second substrate 20, as shown in FIG. 2, FIG. 3 and FIG. 7; or may form an acute angle with the second substrate 20, as shown in FIG. 4-FIG. 6.) The main post spacer 1 has a bearing face which is fitting with the stopping face A and is arranged opposite to the stopping face A. The stopping face A is arranged at a side of the bearing face close to the first substrate 10. When the main post spacer 1 moves in the direction away from the second substrate 20, the stopping face A may exert a force to the main post spacer 1 via the bearing face, where the force points to the second substrate 20 and is perpendicular to the second substrate 20.

Hence, the main post spacer 1 is stopped from moving in the direction away from the second substrate 20 and the main post spacer 1 and the second substrate 20 are kept in a seamless state.

Alternatively, the stopping face A may be set a certain distance away from the bearing face. In this case, after the main post spacer 1 moves a certain distance in the direction away from the second substrate 20, the stopping structure 4 stops the main post spacer 1 from continuing moving and keeps the main post spacer 1 and the second substrate 20 in a seamless state, thereby further increasing a filling amount of liquid crystals, increasing the upper limit of liquid crystal filling and improving the productivity of the production line.

The main post spacer 1 has a first top face B. The first top face B may be arranged directly against the second substrate 20 or may be arranged against the stopping structure 4. In both cases, a seamless state between the main post spacer 1 and the second substrate 20 can be realized.

In a specific implementation, as shown in FIG. 2 and FIG. 3, in a direction parallel to the second substrate 20, the main post spacer 1 and the stopping structure 4 are staggered. The main post spacer 1 has a first top face B. The first top face B is against the second substrate 20 and seamlessly fits with a surface of the second substrate 20, such that the main post spacer 1 and the second substrate 20 are in a seamless state.

Furthermore, the stopping structure 4 may be provided with a stopping face, and the main post spacer 1 may be provided with a bearing face fitting with the stopping face, thereby stopping the main post spacer 1 from moving in the direction away from the second substrate 20 and keeping the main post spacer 1 and the second substrate 20 in the seamless state.

Specifically, as shown in FIG. 2, a first groove 41 may be arranged at a surface of the stopping structure 4 opposite to the main post spacer 1. The main post spacer 1 is provided with a first bulge structure 11 at a position corresponding to the first groove 41. The first bulge structure 11 extends into the first groove 41. A groove wall of the first groove 41 close to the first substrate 10 is a stopping face A. A surface of the first bulge structure 11 opposite to the stopping face A is a bearing face. When the main post spacer 1 moves in the direction away from the second substrate 20, the stopping face A may stop, via the bearing face, the main post spacer 1 from moving in the direction away from the second substrate 20 and keep the main post spacer 1 and the second substrate 20 in the seamless state.

Furthermore, the stopping face A of the stopping structure 4 may be arranged a certain distance D away from the bearing face of the main post spacer 1, to further increase the upper limit of liquid crystal filling.

Optionally, as shown in FIG. 3, the stopping structure 4 is made of an elastic material and has a length approximately similar to that of the main post spacer 1. The stopping structure 4 is elastically compressed between the first substrate 10 and the second substrate 20 and cooperates with the main post spacer 1 to maintain a cell gap of the liquid crystal panel.

In another specific implementation, as shown in FIG. 4-FIG. 6, a position of the main post spacer 1 corresponds to a position of the stopping structure 4. The stopping structure 4 has a second top face. The first top face B of the main post spacer 1 is against the second top face and the first top face B seamlessly fits with the second top face. In addition, the stopping structure 4 is used to stop the main post spacer 1 from moving in the direction away from the second substrate 20; hence, the main post spacer 1 and the second substrate 20 are kept in a seamless state because of the stopping structure 4.

The stopping structure 4 may be made of an elastic material or may be made of an inelastic material. The first top face B of the main post spacer 1 may be a flat surface (parallel to the first substrate 10 as shown in FIG. 4), an inclined surface (forming a relatively small angle with the first substrate 10 as shown in FIG. 5) or a curved surface (as shown in FIG. 6). Optionally, the first top face B of the main post spacer 1 is a flat surface or a curved surface, leading to a more stable force to maintain the cell gap of the liquid crystal panel.

Furthermore, the stopping structure 4 may be provided with a stopping face, and the main post spacer 1 may be provided with a bearing face fitting with the stopping face, thereby stopping the main post spacer 1 from moving in the direction away from the second substrate 20 and keeping the main post spacer 1 and the second substrate 20 in the seamless state.

Specifically, as shown in FIG. 4-FIG. 6, a second groove 42 is arranged at a surface of the stopping structure 4 close to the first substrate 10. A longitudinal section of the second groove 41, which is perpendicular to a groove bottom of the second groove 42, includes a portion having a shape which turns larger downwardly, and a top portion of the main post spacer 1 has a shape which turns smaller downwardly to fit with the longitudinal section of the second groove 42. The top portion of the main post spacer 1 extends into the second groove 42. The first top face B of the main post spacer 1 may be against the groove bottom of the second groove 42; that is, the second top face is the groove bottom of the second groove 42, the first top face B seamlessly fits with the groove bottom of the second groove 42, and a longitudinal section of a bottom portion of the second groove 42 has a shape which turns larger downwardly. A groove wall of the portion having the shape which turns larger downwardly of the longitudinal section of the second groove 42 serves as the stopping face A of the stopping structure 4. A lateral face of the top portion of the main post spacer 1 serves as the bearing face of the main post spacer 1. The stopping face A exerts, via the bearing face, a force to the main post spacer 1, to stop the main post spacer 1 from moving in the direction away from the second substrate 20.

Optionally, the stopping face A of the stopping structure 4 is arranged a certain distance away from the bearing face of the main post spacer 1, to further increase the upper limit of liquid crystal filling.

In the case that the first top face B of the main post spacer 1 is against the second top face of the stopping structure 4, a stopping pillar 5 may be arranged on the second top face of the stopping structure 4, to stop the main post spacer 1 from moving in the direction away from the second substrate 20. Specifically, as shown in FIG. 7, a third groove 43 may be arranged at a surface of the stopping pillar 5, the surface being close to and opposite to the main post spacer 1. The main post spacer 1 is provided with a second bulge structure 12 at a position corresponding to the third groove 43. The second bulge structure 12 extends into the third groove 43. The third groove 43 exerts, via the second bulge structure 12, a force to the main post spacer 1, to stop the main post spacer 1 from moving in the direction away from the second substrate 20.

In specific implementations of the present disclosure, the main post spacer 1 is stopped from moving in the direction away from the second substrate 20 by the cooperation of the groove and the bulge. In the specific implementations, the bulge is arranged at the main post spacer 1 and the groove is arranged at the stopping structure 4. In practical application, alternatively, the above objective can be realized by arranging a groove at the main post spacer 1 and arranging a bulge at the stopping structure 4.

As shown in FIG. 3, a liquid crystal panel according to an embodiment of the present disclosure specifically includes:

a first substrate 10 and a second substrate 20 which are arranged oppositely to form a cell, where a space between the first substrate 10 and the second substrate 20 is sealed by a sealant 3 to form a sealed space;

a liquid crystal layer (not shown in the drawings) filled in the sealed space;

a main post spacer 1 and an auxiliary post spacer 2 arranged on the first substrate 10, where the main post spacer 1 is an elastic material and the main post spacer 1 and the auxiliary post spacer 2 have a certain height difference; after the liquid crystal panel is to form a cell, the main post spacer 1 is elastically compressed between the first substrate 10 and the second substrate 20 to maintain a cell gap of the liquid crystal panel, while the auxiliary post spacer 2 has no amount of compression; the auxiliary post spacer 2 is only compressed when the liquid crystal panel is subjected to a pressure, functioning as a main supporting member to enhance the compression resistivity of the liquid crystal panel; and a stopping structure 4 arranged on the second substrate 20, which is made of an elastic material and has a height approximately similar to that of the main post spacer 1; where the stopping structure 4 is elastically compressed between the first substrate 10 and the second substrate 20; a first groove 41 is arranged at a surface of the stopping structure 4, the surface being opposite to the main post spacer 1; the main post spacer 1 is provided with a first bulge structure 11 at a position corresponding to the first groove 41; the first bulge structure 11 extends into the first groove 41; a groove wall of the first groove 41 close to the first substrate 10 is a stopping face A which is parallel to the second substrate 20, a surface of the first bulge structure 11 opposite to the stopping face A is a bearing face; when the main post spacer 1 moves in a direction away from the second substrate 20, the stopping face A may exert, via the bearing face, a force pointing to and perpendicular to the second substrate 20, to the main post spacer 1 to stop the main post spacer 1 from moving in the direction away from the second substrate 20 and keep the main post spacer 1 and the second substrate 20 in a seamless state.

A display device is further provided according to an embodiment of the present disclosure, including the liquid crystal panel according to embodiments of the present disclosure, to improve the productivity and ensure qualities of products.

In the technical solutions of the present disclosure, the main post spacer is arranged on the first substrate, the stopping structure used to stop the main post spacer from moving in the direction away from the second substrate is arranged on the second substrate. Hence, even if lots of liquid crystals are filled, the main post spacer and the second substrate may be kept in a seamless state due to the stopping structure. The problem of gravity mura caused by the amount of compression of the main post spacer being zero and a gap existing between the main post spacer and the second substrate when lots of liquid crystals are filled is solved, thereby increasing the upper limit of liquid crystal filling and improving the productivity of the production line. In addition, the height difference between the main post spacer and the auxiliary post spacer can be designed based on compression resistance requirements for the liquid crystal panel, to ensure qualities of products.

The above described are merely optional implementations of the present disclosure. It should be noted that, the ordinary skilled in the art can make various improvements and variants without departing from the technical principle of the present disclosure. All the improvements and variants fall within the scope of protection of the present disclosure.

What is claimed is:

1. A liquid crystal panel, comprising:
  a first substrate and a second substrate which are arranged oppositely to form a cell;
  a liquid crystal layer filled between the first substrate and the second substrate; and
  a main post spacer arranged on the first substrate, wherein the main post spacer is made of an elastic material and is elastically compressed between the first substrate and the second substrate;
  wherein the liquid crystal panel further comprises:
  a stopping structure arranged on the second substrate and configured to stop the main post spacer from moving in a direction away from the second substrate and make the main post spacer contact the second substrate in a seamless state.

2. The liquid crystal panel according to claim 1, wherein the stopping structure is configured to stop the main post spacer from continuing moving after the main post spacer moves a preset distance in the direction away from the second substrate.

3. The liquid crystal panel according to claim 2, wherein the stopping structure has a stopping face, and the stopping face is not perpendicular to the second substrate; and
  the main post spacer has a bearing face which is fitting with the stopping face and is arranged opposite to the stopping face, the stopping face is arranged at a side of the bearing face close to the first substrate.

4. The liquid crystal panel according to claim 3, wherein the stopping face is set a certain distance away from the bearing face.

5. The liquid crystal panel according to claim 1, wherein the main post spacer and the stopping structure are staggered in a direction parallel to the second substrate;
  the main post spacer has a first top face, the first top face is against the second substrate and seamlessly fits with a surface of the second substrate.

6. The liquid crystal panel according to claim 5, wherein a groove is arranged at a surface of the stopping structure opposite to the main post spacer; the main post spacer is provided with a bulge structure at a position corresponding to the groove; and the bulge structure extends into the groove.

7. The liquid crystal panel according to claim 5, wherein the stopping structure is made of an elastic material.

8. The liquid crystal panel according to claim 7, wherein the stopping structure has a length not larger than that of the main post spacer.

9. The liquid crystal panel according to claim 1, wherein a position of the main post spacer corresponds to a position of the stopping structure; the main post spacer has a first top face and the stopping structure has a second top face; the first top face is against the second top face and the first top face seamlessly fits with the second top face.

10. The liquid crystal panel according to claim 9, wherein the first top face of the main post spacer is a flat surface, an inclined surface or a curved surface.

11. The liquid crystal panel according to claim 9, wherein a groove is arranged at a surface of the stopping structure close to the first substrate; a top portion of the main post spacer extends into the groove; a longitudinal section of the groove, which is perpendicular to a groove bottom of the groove, comprises a portion having a shape which turns larger downwardly; and the top portion of the main post spacer has a shape which turns smaller downwardly to fit with the longitudinal section of the groove.

12. The liquid crystal panel according to claim 11, wherein the groove bottom of the groove is the second top face, and a groove wall of the portion having the shape which turns larger downwardly of the longitudinal section of the groove serves as the stopping face of the stopping structure.

13. The liquid crystal panel according to claim 9, wherein the stopping structure comprises a stopping pillar arranged on the second top face; a groove is arranged at a surface of the stopping pillar close to and opposite to the main post spacer; the main post spacer is provided with a bulge structure at a position corresponding to the groove; and the bulge structure extends into the groove.

14. The liquid crystal panel according to claim 1, wherein the stopping structure is made of an elastic material or an inelastic material.

15. The liquid crystal panel according to claim 6, wherein the groove is arranged at the main post spacer and the bulge is arranged at the stopping structure.

16. The liquid crystal panel according to claim 1, further comprising:
an auxiliary post spacer arranged between the first substrate and the second substrate, wherein the auxiliary post spacer and the main post spacer has a preset height difference.

17. A display device, comprising the liquid crystal panel according to claim 1.

18. The liquid crystal panel according to claim 10, wherein a groove is arranged at a surface of the stopping structure close to the first substrate; a top portion of the main post spacer extends into the groove; a longitudinal section of the groove, which is perpendicular to a groove bottom of the groove, comprises a portion having a shape which turns larger downwardly; and the top portion of the main post spacer has a shape which turns smaller downwardly to fit with the longitudinal section of the groove.

19. The liquid crystal panel according to claim 11, wherein the groove is arranged at the main post spacer and the bulge is arranged at the stopping structure.

20. The liquid crystal panel according to claim 13, wherein the groove is arranged at the main post spacer and the bulge is arranged at the stopping structure.

* * * * *